Fig. 5.

Aug. 16, 1960    M. M. CLAYTON    2,949,540
COMBINATION HYDRAULIC TURBINE AND ELECTRIC GENERATOR
Filed June 27, 1957    12 Sheets-Sheet 6

INVENTOR.
Mark M. Clayton

Aug. 16, 1960 M. M. CLAYTON 2,949,540
COMBINATION HYDRAULIC TURBINE AND ELECTRIC GENERATOR
Filed June 27, 1957 12 Sheets-Sheet 7

Fig.9.

INVENTOR.
Mark M. Clayton
BY
ATTORNEYS

Aug. 16, 1960 M. M. CLAYTON 2,949,540
COMBINATION HYDRAULIC TURBINE AND ELECTRIC GENERATOR
Filed June 27, 1957 12 Sheets-Sheet 8

Fig.10.

INVENTOR.
Mark M. Clayton
BY
ATTORNEYS

United States Patent Office 2,949,540
Patented Aug. 16, 1960

2,949,540

COMBINATION HYDRAULIC TURBINE AND ELECTRIC GENERATOR

Mark M. Clayton, Portland, Oreg.

Filed June 27, 1957, Ser. No. 668,579

12 Claims. (Cl. 290—40)

(Granted under Title 35, U.S. Code (1952), sec. 266)

The invention described herein may be manufactured and used by or for the Government for governmental purposes without the payment of any royalty thereon.

This invention relates to improvements in the art of converting hydraulic energy into commercial power, and relates more specifically to improvements in the construction of hydraulic machines such as fluid turbines, pumps, control devices, systems, and still more specifically to a combined turbine and generator power unit for hydroelectric power plants. In instant consolidated turbine-generator unit, the turbine blades are secured within the throat of a venturi-like shaped internal tubular surface of a rotary tubular activating fluid conduit member to efficiently convert the potential head of activating fluid into kinetic energy or useful work to operate the external electric generator means. In a conventional turbine wheel the blades are simply cantilevered from the hub that is hanging from the main shaft. The design of instant aerial-flow turbine requires bearings on each end of the blade and the blades must also support the central hub members. The entrance portion of the penstock to instant turbine is considerably shorter and straighter than that of the large spiral-shaped passage called scroll case normally used for conventional turbines. This arrangement permits delivery of water to the turbine blades at a much more favorable angle for efficient generation of power than is the case of conventional machines. The exit or draft tube is somewhat identical to that used by conventional machines. In instant consolidated turbine-generator unit the rounded ends of the water flow control blades and the turbine impeller blades are for minimizing turbulence or friction in the water stream and to prevent an appreciable amount of activating turbine fluid to leak past the turbine impeller blades without producing power. The governor action of instant turbine compensates for changes in electrical load on the generator and changes of head or pressure of the activating fluid operating the turbine.

In conventional hydraulic turbines the governor means of such turbines are usually direct-acting and arranged to proportion and direct the flow of hydraulic fluid (generally oil) directly to hydraulic servomotors that operate the water supply gates and turbine impeller blades. In the modifications of this invention, the conventional hydraulic servomotors may be replaced with small pressure switches to operate a control circuit to energize large servomotors to selectively operate the water control gates and pitch of turbine impeller blades for uniform and controlled turbine and generator speed to maintain the desired power output during operation. Such an arrangement would permit the use of a relatively small and inexpensive hydraulic turbine governor regardless of the size of the turbine being controlled by the governor.

Most modern hydroelectric generating units operate as a part of an integrated power system, making it absolutely necessary that the speed of the rotating parts be held within extremely close speed limits. The conventional means to accomplish this is to employ the well known fly ball governing element, as indicated by page 897, Fig. 20, in Hydro-Electric Handbook, by Creager and Justin, 2d Edition, published 1950, by John Wiley and Sons, of New York, N.Y., or other suitable governor means well known in the art.

It is a primary object of this invention to provide a new and novel combined unitary hydraulic turbine and alternator unit for converting fluid energy into electrical energy.

It is another object of this invention to provide as an integral unit a hydroelectric turbine and electric generator having the rotating elements of turbine and generator integrally connected without the use of shafts or other power transmitting means.

It is a further object of this invention to provide in combination a hydroelectric power unit having a central passage for the turbine activating fluid extending centrally through the turbine and electric generating elements.

It is another object of this invention to provide a compact hydroelectric power generating unit whereby the energy of the moving stream of activating turbine fluid is converted into useful work by the turbine which turns the generator rotor by the central tubular conduit coupling member which in turn translates by electric generator means the useful work into electrical energy.

It is a still further object of this invention to provide a self-contained hydroelectric turbine and electric generator unit in which substantially all of the fluid passing through the turbine element must act on the streamlined turbine blades to prevent escape of fluid through the turbine which does not perform useful work.

It is another object of this invention to provide a compact unitary turbine-generator device having a rotary and central power fluid conduit streamlined therethrough which comprises the unitary structure of the rotary penstock of the turbine means and rotor means of the electric power generator.

It is also an object of this invention to provide as a compact unitary combination a fluid turbine and electric generator wherein fluid flow may be controlled by a single valve element.

It is another object of this invention to provide in unitary combination a fluid turbine and electric generator wherein fluid flow may be controlled by a combination of movable streamlined vanes operated by a single rotating shaft or tube.

It is, therefore, an object of this invention to provide an improved fluid turbine and generator unit that may be economically installed and serviced by placing the essential working parts of the unit in an accessible compact arrangement and eliminating all parts not necessary for dependable operation to decrease maintenance cost of the unit.

It is another object of this invention to provide in unitary combination a fluid turbine and electric generator wherein fluid flow may be controlled by a combination of movable streamlined vanes operated by a single rotating shaft or tube element, and the pitch of the turbine blades may be variably controlled by a single rotating shaft or tubular element.

It is an object of this invention to provide as a unitary combination a fluid turbine and electric generator with means that permit independent variable adjustment of water flow vanes and turbine blades from outside the fluid passage while the turbine and generator combination is in rotary motion.

Another object of the invention is to provide an improved and streamlined fluid turbine of the above type in which novel and effective means are provided for actuating the runner blades to adjust the angle thereof while the turbine is in operation.

Another object of the invention is to provide an improved turbine of the above type in which means are provided for utilizing power from the revolving runner shaft for operating the adjusting mechanism of the streamlined runner blades.

It is another object of this invention to provide in combination with a unitary turbine-generator device, with a central and streamlined power fluid flow through the device, a small and compact turbine governor device and control circuit means which by single-phase energized current means, floating and synchronized pressure switch means energizes by switch means and three-phase current supply selectively a plurality of large fluid flow control motors and turbine impeller pitch control motors to control and maintain the desired speed and power output of the turbine-generator device during its operation.

It is a further object of this invention to provide an improved turbine-generator device in which a rotary tubular unit is a multipurpose unitary structure which serves as a streamlined power fluid conduit means, turbine means and generator rotor means concentrically disposed substantially within the surrounding generator stator and housing means of the turbine-generator device.

Another object of the invention is to provide an improved turbine of the character mentioned, which is simple in construction, reliable, and exact in function under all conditions of service.

The invention also comprises certain new and useful improvements in the construction, arrangement, and combination of the several parts of which it is composed as will be hereinafter more fully described and claimed.

Other objects and the manner in which the same can be attained will appear from the following description.

In the drawings affixed to this specification and forming part thereof, several embodiments of the invention are illustrated diagrammatically and in section by way of example.

In the drawings.

Figure 1:
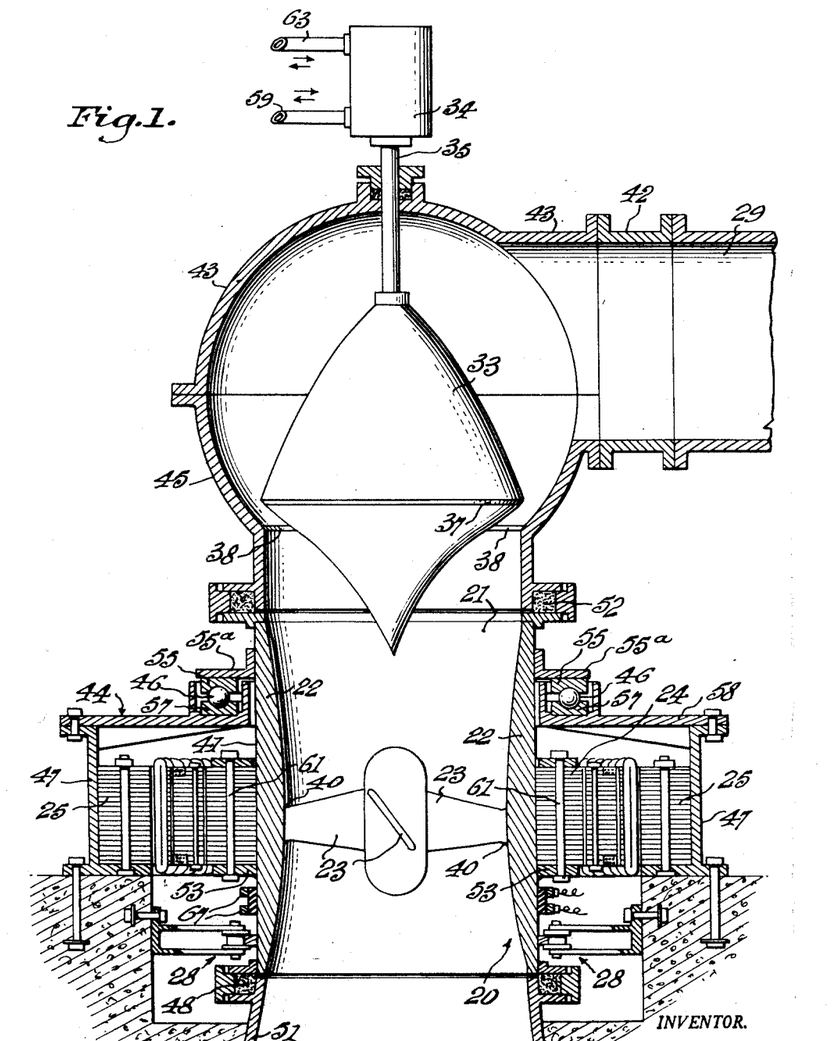
Fig. 1 is a vertical, central and part sectional view through a turbine installation showing one embodiment of the invention in which the streamlined impeller blades of the turbine are welded or fixed rigidly to the inside walls of the rotatable portion of the turbine supply waterway or penstock.
Figure 2:
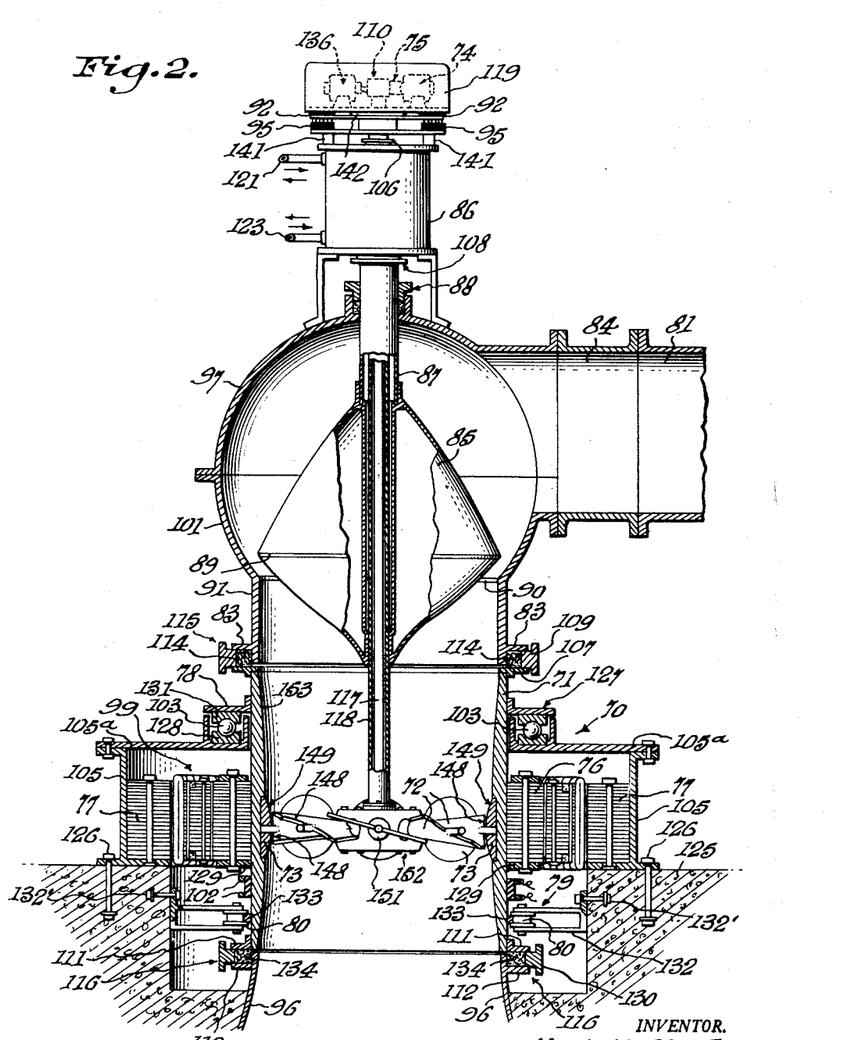
Fig. 2 is a vertical, central and part sectional view through a turbine installation showing another embodiment of the invention in which the innermost radial ends of the streamlined turbine blades in the rotatable penstock are rotatably mounted in bearings, whereby the radial and central end of the blades terminate in control gears of a gear train in a spaced radial relationship in a central control gear hub, and the outer circumferential ends of the streamlined turbine blades are mounted in plain bearings secured to the inner walls of the rotatable tubular water supply member or penstock.
Figure 10:
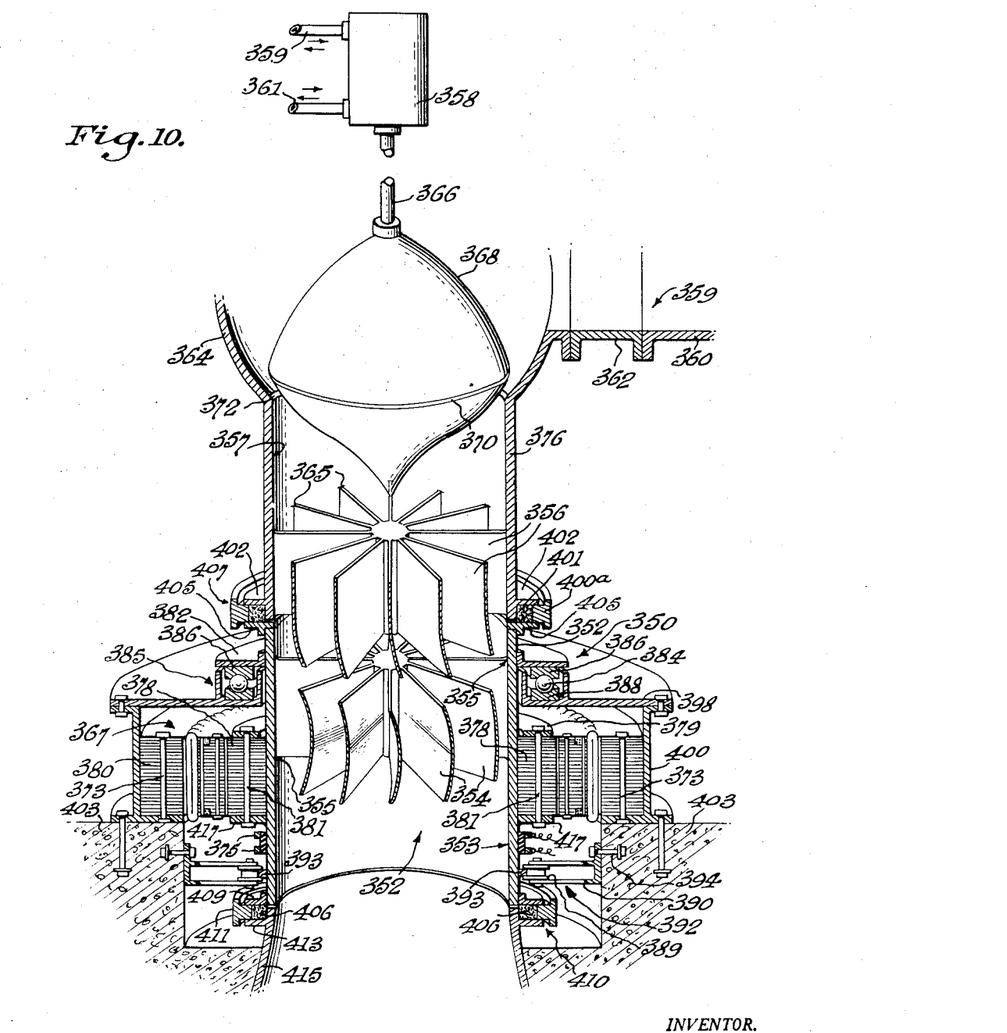
Fig. 10 is a vertical sectional view of another embodiment of the invention of a turbine installation in which the connecting stationary water supply portion of the penstock to the rotatable penstock member (containing the turbine impeller blades) carries integrally fixed to its inner walls curved radial directional vanes to selectively direct the flow of activating fluid against the rotating turbine impeller blades below to efficiently convert the energy of the moving stream of fluid to do useful work on the turbine impeller blades which in turn is converted into electrical energy by the electrical generator.
Figure 11:
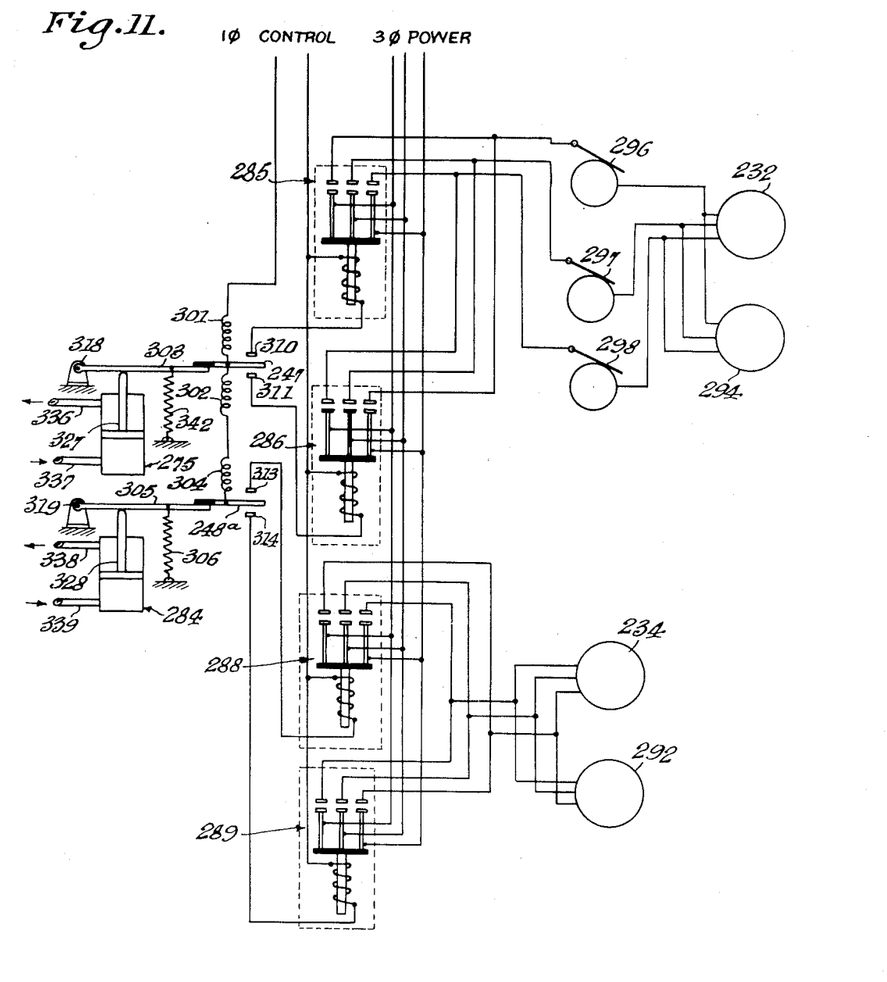
Fig. 11 is a general schematic diagram of the electrical-hydraulic-mechanical control mechanism of the turbine of Fig. 4 at normal speed and load condition.
Figure 12:
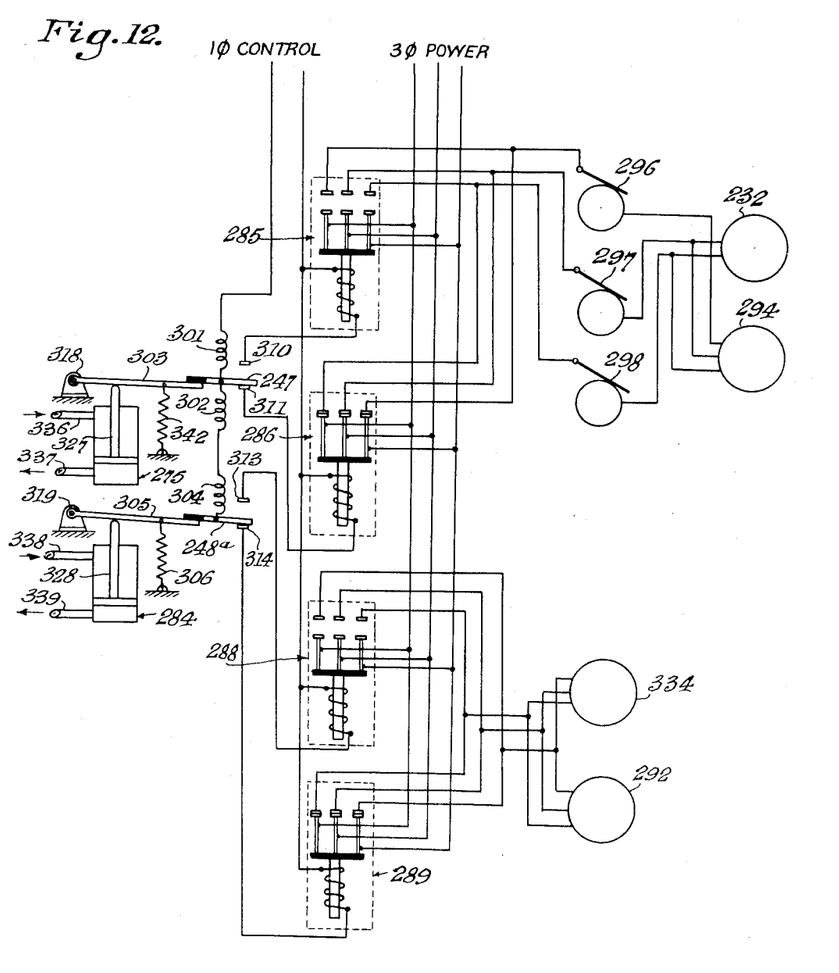
Fig. 12 is a general schematic diagram of the electrical-hydraulic-mechanical control mechanism of the turbine of Fig. 4 when the turbine is momentarily beginning to operate below normal speed condition.
Figure 13:
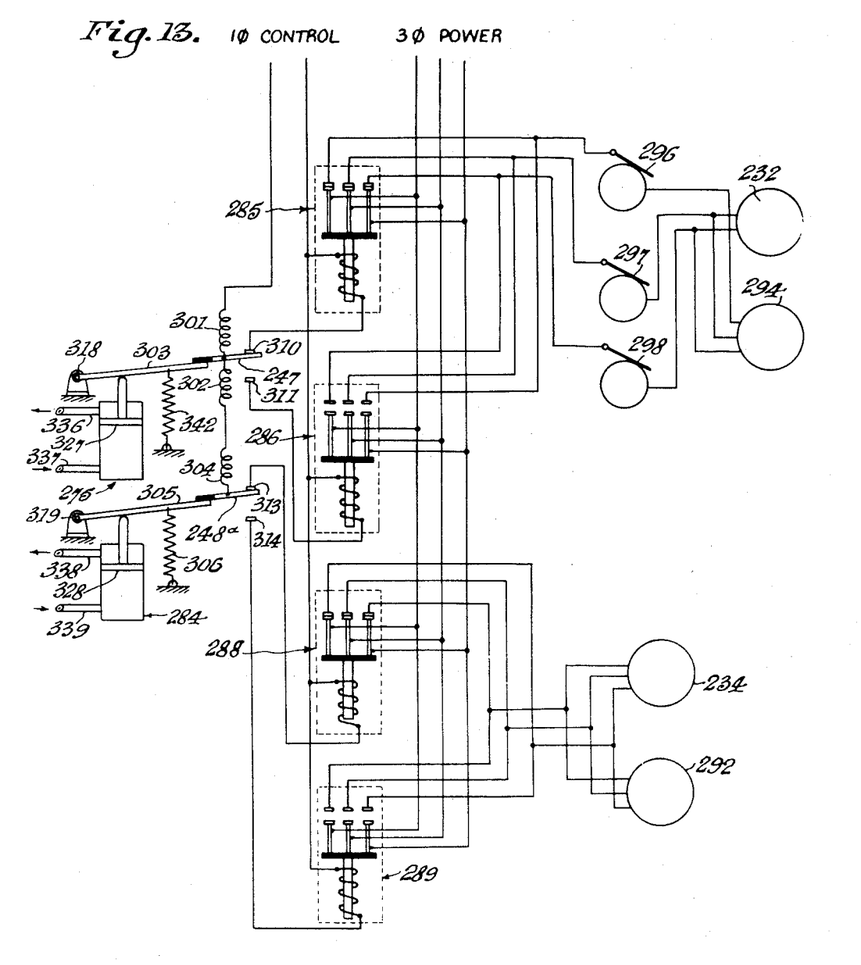
Fig. 13 is a general schematic diagram of the electrical-hydraulic-mechanical control mechanism of the turbine of Fig. 4 when the turbine is momentarily beginning to operate above normal speed condition.

It is to be understood that Figs. 11, 12, and 13 may be adapted by one skilled in the art to control other embodiments of the turbine as shown by Figs. 1, 2, and 10.

Referring to the drawings, Fig. 1 is illustrative of the general arrangement of one embodiment of the unitary turbine and generator means of this invention in which impeller blades 23 of the turbine 20 are rigidly secured at junctions 40 to the streamlined inside walls 22 of the rotatable tubular member 21 of the turbine 20. Rotatable tubular member 21 is a dual purpose unitary structure which serves as a turbine activating fluid conduit, carries internally the turbine means, and carries by its external flange 53 generator rotor 24 of generator 44. Rotor member 24 is concentrically and rigidly secured in fixed relationship to the outer surface 41 of member 21 by integral flange 53 and bolt means 61. Rotor 24 of the turbine generator 44 is surrounded by stator member 25 in juxtaposed position being substantially enclosed by casing member 47 and plate-like ring member 58. Turbine 20 is carried by ball race 55 secured to flange 55a and bearing means 46 which cooperates with ball race 57 carried by member 58. Hydraulic conduit means 29 for the turbine and generator combination consists of tubular members 42, 43, and 45. Member 45 is connected by rotary sealing means 52 to rotary tubular member 21 which is connected by rotary sealing means 48 to stationary draft tube member 51. The turbine means 20 generally consists of rotary tubular member 21 and streamlined turbine impeller blade members 23 secured integrally at junctions 40 to the inside venturi-like surfaces 22 of rotary tubular member 21. Generator means 44 of Fig. 1 is generally illustrated by rotor means 24 (carried by unitary turbine and rotary tubular means 20) being surrounded concentrically by generator stator means 25. Coils of rotor means 24 are energized by direct current from an auxiliary generator (not shown) through slip rings 67. The valve means 33 controls the flow of water to turbine 20. Valve member 33 is provided with a seating surface 37 which cooperates with a seat 38 on the casing 45. Member 33 is attached by valve stem 35 to servo motor 34 which is responsive to the turbine governing means. Servo motor 34 is connected and energized by fluid linkage by pipes 59 and 63 to the turbine governor. The turbine governor means may be of any conventional type as indicated by page 897, Fig. 20, in Hydro-Electric Handbook, by Creager and Justing, 2d Edition, published 1950, by John Wiley and Sons of New York, N.Y., as illustrated by U.S. Patent No. 1,607,833, or other suitable type of governors well known in the art of the flyball centrifugal force type which may be driven by direct turbine drive or by an electric motor receiving current from a separate generator operated in synchronism with the turbine in which the turbine governor operates through a servo motor 34 the valve member 33 in a manner designed to regulate the speed of the turbine unit 20 within a desired speed range by increasing or decreasing the flow of turbine activating fluid (water) supplied to the turbine impeller blades 23 in order to maintain a proper balance between power output and power demand when a change in load occurs. Turbine 20 is supported laterally by bearing means 28.

Figure 14:
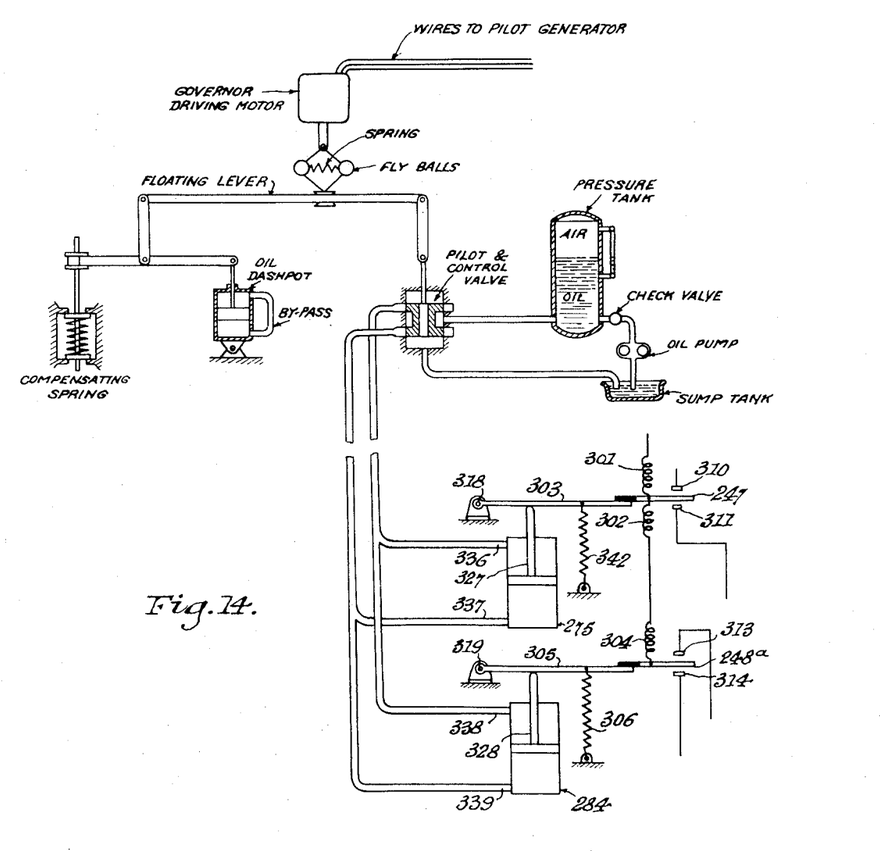
Fig. 14 is a diagrammatic illustration of a fly ball governor control arrangement showing the manner of connection to the control diagram of Figs. 11, 12, and 13.

Fig. 14 illustrates how the fly ball governor of Fig. 20, page 897 of Hydro-Electric Handbook, by Creager and Justin, cited above, may be directly connected to hydraulic pipe members 336, 337, 338, and 339 of Figs. 11, 12, and 13 of instant invention to responsively control the operation of the turbine.

Patent No. 1,607,833, Fig. 1, cited above, illustrates by its members 35 and 8 how a fly ball governor may be mechanically directly connected to rotating member 218a of the turbine to selectively control the turbine.

Electrical energy for operating the governor driving motor may be provided by a pilot generator of the permanent magnet type which could be driven by member 218a, either directly connected to rotate in unison with the case containing the blade pitch control mechanisms, or by gears or belts from member 218a.

An alternative way of including a pilot generator would be to place permanent magnets on the main generator rotor and arrange stator coils as a separate part of the generator stator.

The above cited methods of mechanically and electrically connecting a fly ball governor to a turbine to control same are considered to be conventional, well within the skill of one versed in the art to apply, and to which applicant makes no claim of novelty.

Figure 3:
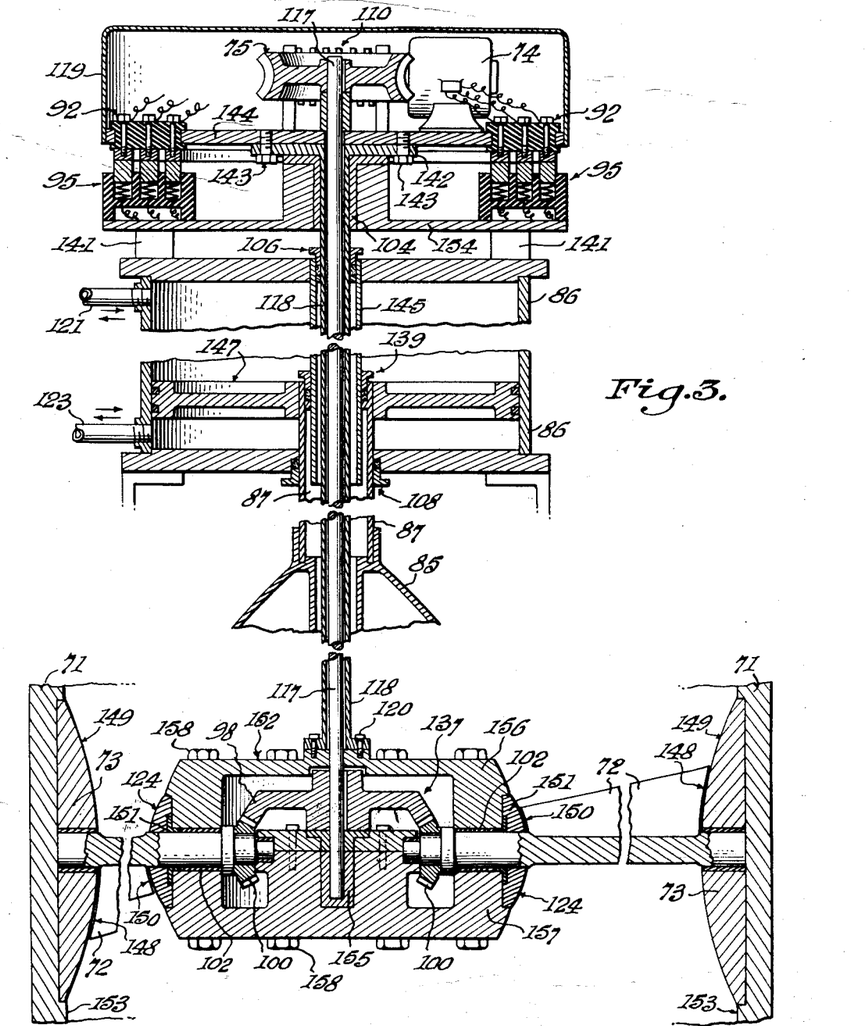
Fig. 3 is an enlarged sectional view of the control mechanism for controlling the water flow means and turbine blade pitch in accordance with load variation of the embodiment of the invention shown in Fig. 2.
Figure 4:
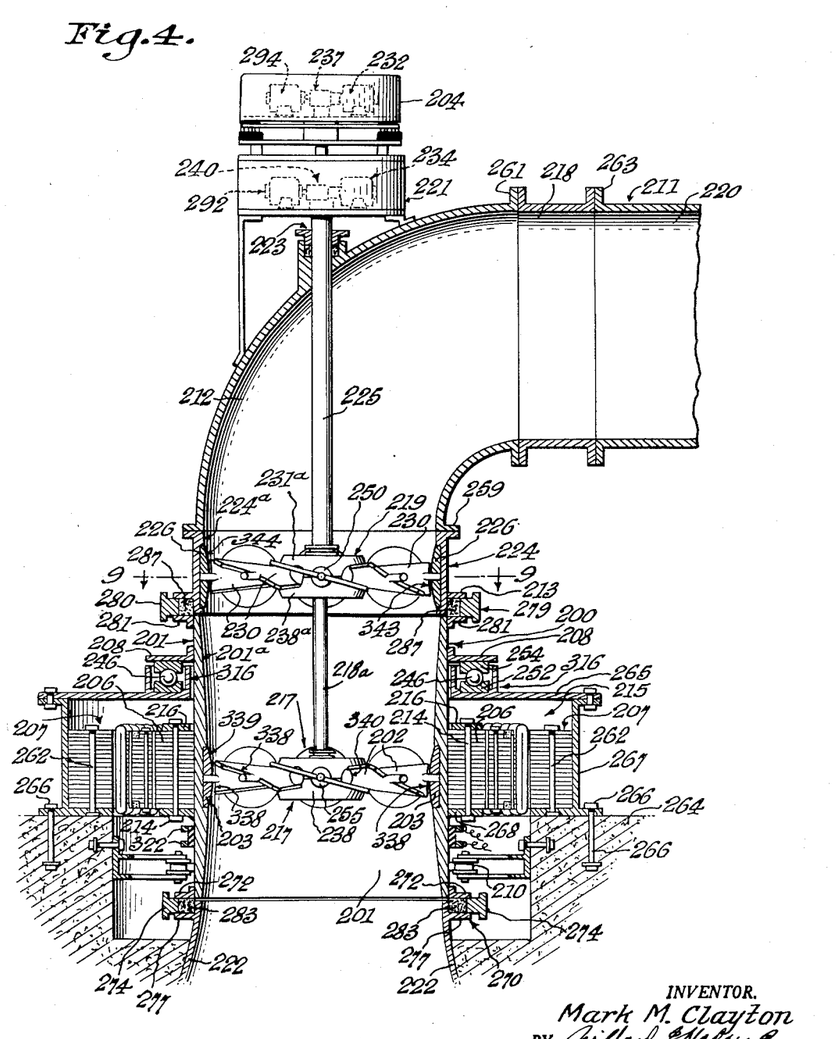
Fig. 4 is a vertical sectional view of another embodiment of the invention of a turbine installation in which the pitch of the vanes controlling the entrance of water to the turbine blades is controlled by an electro-mechanical means external to the sweeping elbow portion of the stationary portions of the turbine penstock.

Figs. 2 and 3 illustrate another embodiment of the invention in which the pitch of the turbine impeller blades 72 is automatically adjusted by governor means through electrical servomotors 74 and 136, gear train 110, shaft 117, and impeller gear train 137 for various operating conditions. The conduit means for the activating supply fluid to and from turbine 70 comprises stationary conduit members 81, 84, 97, 101, rotary conduit member 71 and stationary draft tube 96. Tturbine means 70 comprises generally rotary tubular conduit member 71, variable pitch impeller blades 72 secured in bearing means 73, tubular shaft 118, and impeller pitch control gear train means 137 in which radial bearings 73 are secured to the internal venturi-like wall of rotary tubular member 71 as disclosed. The outer circumferential end portions 148 of the radially disposed variable pitch turbine impeller blades 72 are arcuately concave to adjustably comate and coact with arcuately convex external surface portions 149 of bearing means 73, and the innermost central end surface portions 150 of turbine impeller blades 72 are likewise arcuately concave to adjustably comate and coact with the external arcuate convex surface portions 124 of bearings 151 in pitch control gear hub 152 to prevent excessive fluid turbulence and uncontrolled passage of activating fluid (water) past turbine blades 72 to reduce wasteful energy losses in the operation of turbine 70. Turbine 70 and generator rotor 76 of this embodiment is a unitary structure in that rotor 76 is secured to rotatable tubular member 71 by external flange 129 of member 71 in a fixed relationship intermediate the tubular ends of 71, which ends are sealed by fluid tight rotary sealing means 115 and 116 to stationary members 91 and 96, respectively.

Generator means 99 of Figs. 2 and 3 is generally illustrated by generator rotor means 76 which is carried as a unitary part of rotary tubular conduit means 71 being surrounded concentrically by generator stator means 77. Coils of rotor means 76 are energized by direct current from an auxiliary generator (not shown) through slip rings 102. Stator means 77 of generator 99 surrounds concentrically and in juxtaposed relationship the generator rotor 76, all of which is substantially enclosed by stator housing 105. Housing 105 is secured by bolt members 126 to foundation means 125 as disclosed.

Rotary tubular member 71 is operably supported by thrust bearing means 127, and is secured in horizontal alignment by guide bearing means 79. Thrust bearing means 127 comprises generally flange member 78 of tubular member 71, bearing race 128 carried by plate member 105a, bearing race 131 secured to member 78, and bearing means 103.

Rotary sealing means of Figs. 2 and 3 comprises sealing means 115 and 116. Sealing means 115 comprises stationary flange member 83, rotary flange member 107, a suitable sealing material 114, and outer sealing ring 109. Rotary sealing means 116 comprises rotary flange member 111 and stationary flange 112, suitable sealing material 134 and outer sealing ring 130. Sealing means 115 and 116 substantially prevent the escape of actuating turbine fluid (water) at the jointures of rotating conduit member 71 with stationary penstock member 91 and stationary draft tube member 96. Rotary tubular member 71 is supported by concentric thrust bearing means 103 and held in lateral alignment by guide bearing means 79. Bearing means 79 comprises roller members 80, bolt means 132', support means 132 for members 80, and bearing ring 133 integrally secured to rotary tubular member 71

The fluid control means of Figs. 2 and 3 is cooperatively synchronized by the aforementioned governor means with turbine 70 by fluid linkage indicated by conduit members 121 and 123 to actuate and control servomotor 86. As power load demands fluctuate, the fluid flow control means increases or decreases the amount of activating fluid supply to turbine 70, while the pitch angle of the turbine impeller blades 72 is varied with reference to the velocity of the activating fluid stream (of water) to give maximum impact of the activating fluid against impeller blades 72 to maintain constant speed of the electrical generator with a maximum efficiency in turbine power output to satisfy fluctuating electric power load demands.

Referring more especially to Fig. 3, the pitch of turbine impeller blades 72 is varied by governor impulses commutated by slip ring means 95 and 92 to cooperatively energize and control servo motors 74 and 136 in Fig. 2 which by worm gear train means 110 operate gear 75 secured rigidly to shaft 117 which transmits the torque of motors 74 and 136 to crown bevel gear 98 of gear train 137 which operatively intermeshes with bevel gear means 100 secured to the central inner radial ends of radial and streamlined impeller turbine blades 72 to vary the pitch of blades 72. Gear housing 152 is secured by bolt means 120 to supporting concentric tubular shaft member 118 which terminates at the other end in flange member 142 secured by bolt means 143 to base member 144 of housing 119. Member 104 serves as a bushing or bearing means for tubular member 118, passing through base support 154 of slip ring means 95. Member 154 is supported by members 141 as shown. Turbine impeller control gear housing or hub 152 is composed of two symmetrical bisectional members 156 and 157 secured together by a plurality of bolt members 158. Rotary impeller control gear hub 152 contains a bevel gear train 137 composed of crown gear 98 and bevel gears 100 attached to the central or innermost radial ends of turbine blades 72 which terminate in bearing means 102 and 151 and the outer ends of impeller blades 72 terminate in bearing means 73 in walls 153 of rotary tubular member 71. The pitch of the turbine impeller blades 72 is controlled in accordance with power load demands interpreted by governor impulses by electric servo motors 74 and 136 in head member 119 (of Fig. 2), which servo motors are connected by gear train 110 to shaft 117, which shaft in turn operably terminates ing gear train 137 and bearing member 155 in impeller control hub 152. Tubular shaft 145 is operably connected to servo motor 86 by sealing means 106. Tubular member 145 is cooperatively connected to tubular shaft 87 by sealing means 139. Piston 147 of servo motor 86 is operably connected by tubular shaft member 87 to valve member 85. Tubular shaft member 87 is operably sealed to servo motor 86 by sealing means 108. Servo motor 86 is operated by hydraulic fluid impulses from the aforesaid governor means which selectively react on opposite sides of reciprocating piston 147 to cooperatively and operably move by tubular shaft means 87 actuating fluid flow control valve means 85 in response to the aforementioned governor impulses. Valve member 85 is a concentric member of the shape disclosed having a seating surface 89 which sealably cooperates with surface 90 of member 91 in a selectively and substantially closed position and concentrically surrounds shaft members 117 and 118. Sealing means 88 carried by member 97 surrounds shaft 87 in an operable and sealing relationship.

Figure 9:
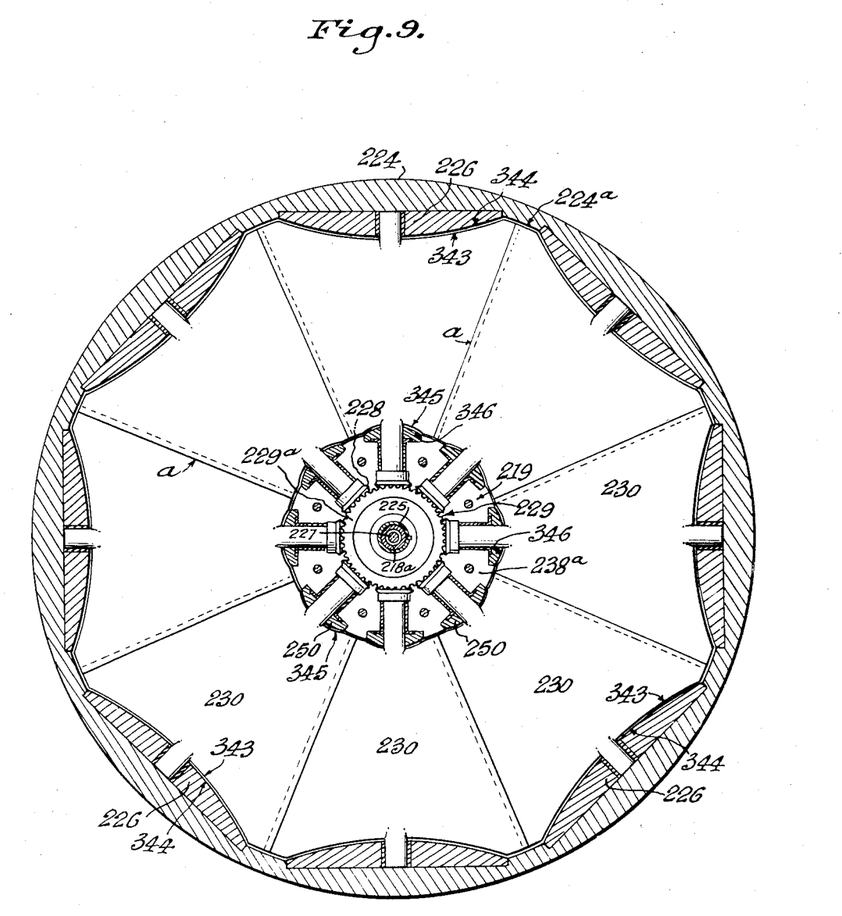
Fig. 9 is a horizontal sectional view taken on line 9—9 of Fig. 4.

Figs. 4, 5, 6, 7, 8, 9, 11, 12, and 13 illustrate another embodiment of the unitary turbine and generator means which contemplates a unitary turbine and generator structure whereby the quantity of activating liquid which is admitted to the turbine 200 so that the degree of maximum impact of the entering liquid with turbine blades 202 is determined by the angularity of the streamlined water flow control vanes 230 and the turbine impeller blades 202 which may be varied simultaneously and/or independently of each other, to produce maximum efficiency of operation of the unitary turbine and generator unit under all load conditions. While the invention is illustrated as applied to a hydraulic turbine of the reaction type, it is to be understood that this invention is not limited to fluid turbines of the reaction type, as it is obvious that the principles of this invention may be readily applied to other fluid machines, such as axial flow or turbine type pumps, wherein it is desirable to accommodate or to produce varying characteristics of the fluid discharge flow. In this embodiment, rotary tubular member 201 is a dual purpose unitary structure which serves as a water conduit through turbine means 200 and generator rotor means 206 of generator 215. Electric generator means 215 comprises in general a rotor member 206 supported by rotary tubular member 201 and stator means 207 concentrically surrounding rotor 206. Stator 207 of generator 215 is secured by bolt means 262 to stator housing 267 which in turn is secured by bolt means 266 to foundation means 264 as disclosed. Rotor member 206 is concentrically and rigidly secured by members 216 and 214 to integral flange 268 of member 201. Rotor 206 of generator 215 is concentrically surrounded by stator member 207 in juxtaposed position being enclosed by casing member 267 and plate-like ring support member 265. Coils of rotor means 206 are energized by direct current from an auxiliary motor (not shown) through slip rings 322. Thrust bearing means 316 comprises plate member 265, bearing races 252 and 254 which retains bearing means 246. Bearing race 254 is secured to integral flange 208 of rotary tubular member 201. Water conduit means 211 for the unitary turbine and generator combination comprises stationary tubular members 220, 218, elbow member 212, member 224 containing adjustable fluid flow blades 230, rotatable tubular turbine member 201 and stationary draft tube member 222. Tubular member 220 is connected by flange member 263 to tubular member 218. Tubular member 218 is secured to elbow member 212 by flange connection 261. Elbow 212 serves as a support for servo motor housings 204 and 221 which operably communicate by concentric shaft means 225 and 218a and packing gland means 223 with the integral water flow control hub 219 and turbine propeller control hub 217 which controls the opening or pitch of streamlined gate blades 230 and turbine impeller blades 202, respectively. Member 212 is joined by flange means 259 to tubular member 224. Member 224 supports adjustable flow control blades 230 and hub 219 in bearing means 226 secured to the internal and streamlined surface of member 224. Sealing means 270 and 279 prevent the escape of actuating turbine fluid at the jointures of rotating conduit member 201 with penstock member 224 and draft tube member 222. Member 224 is connected by sealing means 279 to rotary tubular member 201. Rotary tubular member 201 is connected by rotary sealing means 270 to draft tube member 222. Sealing means 270 comprises a suitable sealing material 283, flanges 272 and 277 and outer sealing ring 274. Sealing means 279 comprises flange members 213 and 281, suitable sealing material 287 and outer sealing ring 280. In this embodiment of the invention the pitch or degree of opening of the water blades 230 and pitch of turbine impeller blades 202 is automatically synchronized and varied in pitch in accordance with varied power load demand impulses from the governor through control circuit means as illustrated by Figs. 11, 12, and 13. Control hub 217 contains bevel gear train 205 composed of crown gear 251 and bevel gears 253 attached to turbine impeller blades 202 which are operated by servo motors 232 and 294, Fig. 4, in head member 204 through shaft 227 and tubular shaft 218a to vary the pitch of turbine impeller blades 202 in response to the sensing and impulse means of the turbine governor. Likewise, in this embodiment the water flow to the turbine is regulated and efficiently directed against the impeller blades 202 by variable pitch impeller-like overlapping blade members 230 mounted by bearing means 250 in hub 219 and bearing means 226 of stationary penstock member 224. The number of streamlined blade members 230 required may vary with different hydraulic conditions but may be of any desired number that can be arranged so that each blade slightly overlaps each of the adjacent and juxtaposed blades 230 in the closed position as illustrated in Fig. 9. Stationary control gear hub 219 contains a bevel gear train 229 composed of crown gear 229a and bevel gears 228 attached to the central or innermost ends of the blades 230 which terminate in bearing means 250, which are operated by servo motors 234 and 292 in head member 221 by shaft 225. Servo motors 234 and 292 are controlled by governor impulses which automatically vary the opening and pitch of blades 230 in a manner designed to efficiently regulate the water flow to properly maintain the speed of the turbine-generator unit within a desired speed range by increasing or decreasing the amount of water supplied to the turbine impeller blades 202 as the pitch of the turbine blades 202 are synchronously varied for the maximum angle of water impact against the blades 202 in order to maintain sufficient power output to satisfy power demand when a change in power load demand occurs. The outer circumferential end surface portions 338 of the radially disposed variable pitch turbine impeller blades 202 are arcuately concave to adjustably comate and coact with arcuately convex external surface portions 339 of bearing means 203, and the innermost central end surface portions 340 of turbine impeller blades 202 are likewise arcuately concave to adjustably comate and coact with the external arcuate convex surface portions 341 of bearings 255 in pitch control gear hub 217 to prevent excessive fluid turbulence and uncontrolled passage of activating turbine fluid past turbine blades 202 to reduce fluid energy losses in the operation of turbine 200. Similarly, the outer circumferential end surface portions 343 of the radially disposed variable pitch fluid flow control blades or vanes 230 are arcuately concave to adjustably comate and coact with external arcuately convex surface portions 344 of bearing means 226, and the innermost central end surface portions 345 of blades 230 are likewise arcuately concave to adjustably comate and coact with the external arcuate convex surface portions 346 of bearings 250 in blade control gear hub 219 to prevent uncontrolled turbulence and leakage of activating turbine fluid past turbine means 200. In this embodiment of the invention the pitch of both the streamlined water control blade members 230 and the turbine impeller blade members 202 are varied by the governor through circuit control means as illustrated by Figs. 11, 12, and 13 to synchronize the variance of pitch of the turbine impeller blades 202 and the water flow control blades 230 in their operation to bring about a unitary result of maintaining the proper water flow and turbine speed in accordance with high efficiency and power load demand.

Figure 5:
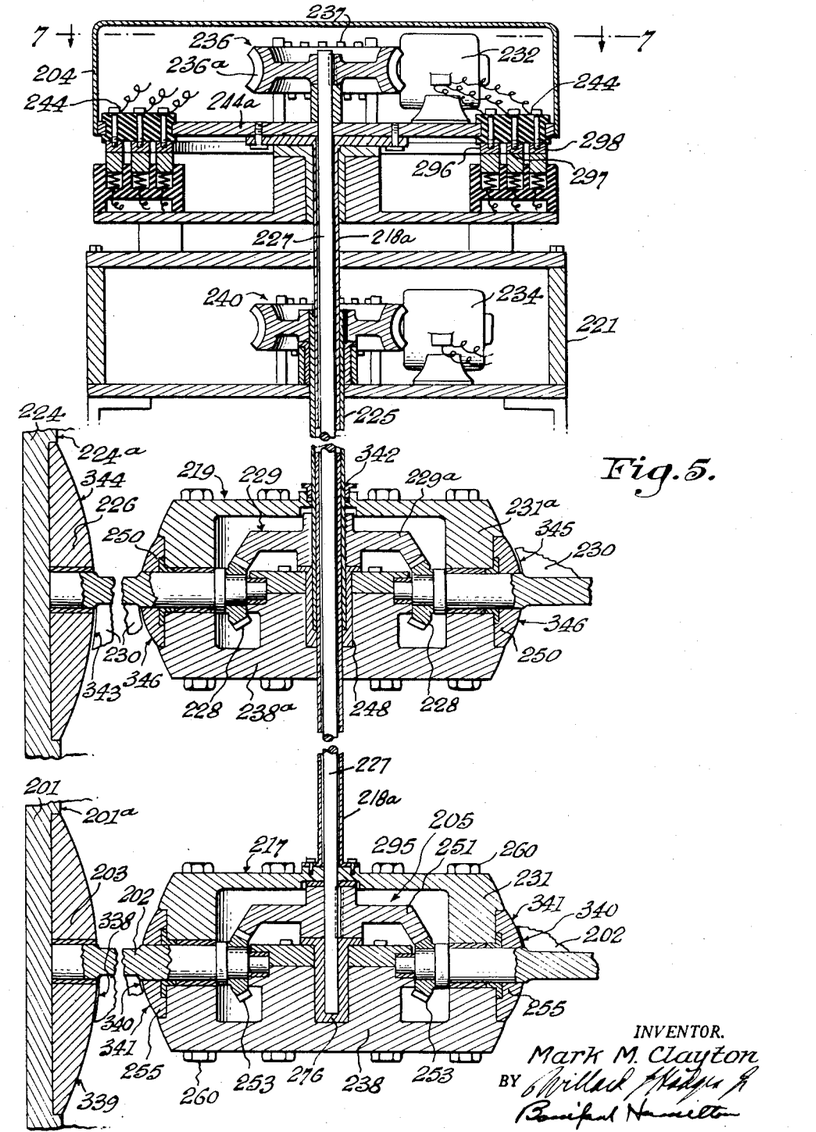
Fig. 5 is an enlarged sectional view of the dual control mechanism of Fig. 4 for controlling both the pitch of the turbine blades and the pitch of the fluid control vanes controlling the entrance of motivating turbine fluid to the streamlined turbine blades in accordance with power load variation and demand to maintain a constant speed for proper phase relationship in the generation of electrical energy.

Referring more especially to Fig. 5, gear train 236 composed of gear worm 237 and central worm gear 236a is operatively joined to servo motors 232 and 294 (of Fig. 4) connected by shaft 227 which is operably attached to gear train 205 by crown bevel gear 251 which operates pinion bevel gears 253 centrally attached in hub 217 to radially extending turbine impeller blades 202 which distal ends terminate in bearing means 203 secured to inner walls 201a of rotary tubular member 201. Shaft 227 is connected to crown bevel gear 251 of gear train 205 and terminates in bearing means 276 in impeller hub 217. Shaft 218a is operably connected to impeller control hub 217 by bolt means 295 and to member 244a supporting floating control head 204, similarly as shown in Fig. 3, members 118, 119, 142, 143 and 144. Tubular shaft 225 is connected to gear train 240 and servo motors 234 and 292 (of Fig. 4) and is operably sealed to water flow control hub 219 by sealing means 342, whereby shaft 225 of hub 219 is operably connected to gear train 229 consisting of crown gear 229a and pinion gears 228 connected to water flow control blades 230, whereby shaft 225 terminates in bearing means 248 in water control hub 219.

Figures 6, 7, 8:
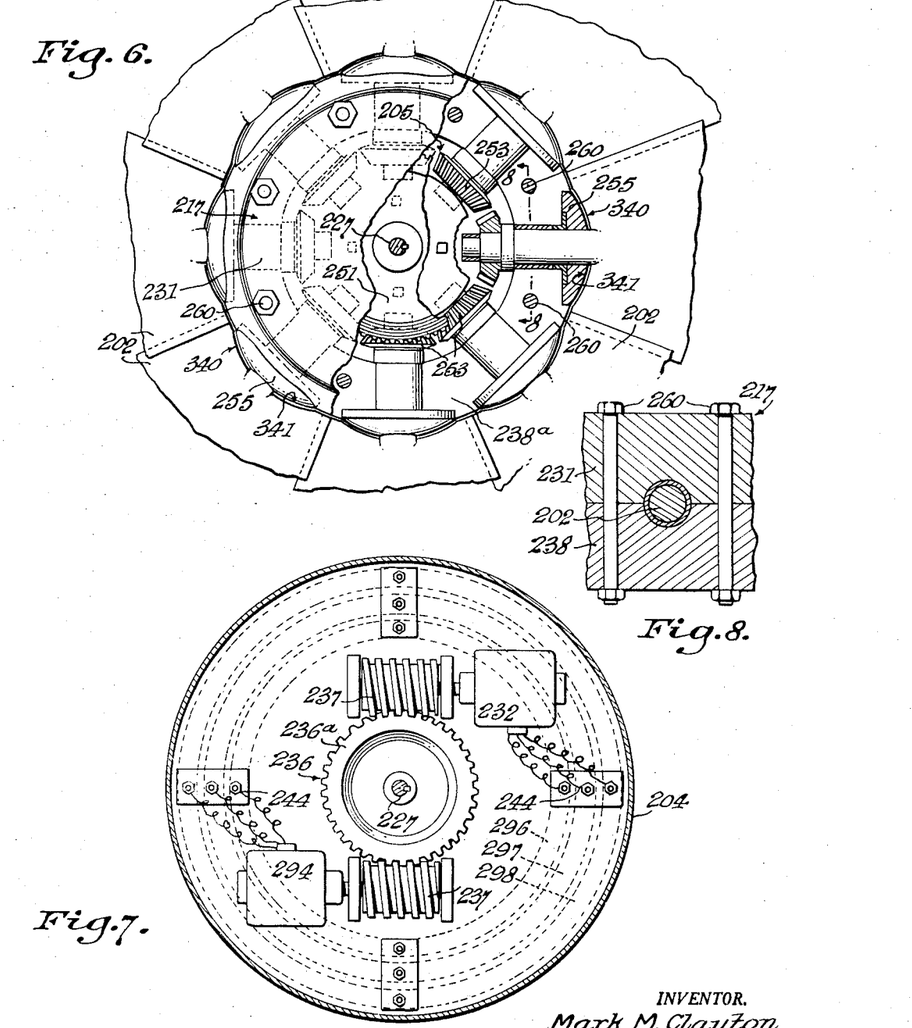
Fig. 6 is a part plan and sectional view of Fig. 4.
Fig. 7 is a plan and sectional view showing the general arrangement of two synchronized electro-servo motors connected to a control shaft to control the pitch of the streamlined turbine blades under varying load conditions, taken on line 7—7 of Fig. 5.
Fig. 8 is a detailed sectional view taken on line 8—8 of Fig. 6.

Fig. 6 shows in plan view the general arrangement of the turbine impeller blades 202 as radially connected to pitch control hub 217.

Fig. 7 shows in plan view the general arrangement of servo motors 232 and 294 as energized by slip ring terminals 244 whereby servo motors 232 and 294 are cooperatively connected by worm gear means 237 to large worm gear 236a (of gear train 236) connected to shaft 227.

Fig. 8 illustrates a sectional view of turbine impeller pitch control hub means 217 showing the two symmetrical bisectional hub elements 231 and 238 secured together by bolt means 260 which contains a sectional end view of the inner ends of turbine impeller blades 202 as secured in bearing means 203.

Fig. 9 illustrates a sectional plan view of stationary penstock member 224, gear train housing 219 with upper gear housing member 231a removed to illustrate in detail the general radial and overlapping water-tight arrangement of water gate blades 230 in their environs of outer circumferential bearing means 226 in stationary penstock member 224 whereby the radial termination of the ends of blades 230 in central bevel gear housing member 238a, bearings 250 and bevel gears 228 operably intermesh with crown bevel gear 229a in which the surfaces 343 and 345 of the outer and inner ends of blades 230 comate with bearing surfaces 344 and 346 for more efficient water flow control preventing waste of water power. Fig. 9 further shows the connection of water control hub means 219 radially connected by overlapping surfaces at (a) of water control blades 230 in which the distal ends of members 230 adjustably terminate in bearing means 226 secured to the inside walls 224a of stationary penstock member 224.

Figs. 11, 12, and 13 illustrate by schematic functional circuit diagrams various operational conditions for the control circuit means of this embodiment of the invention. However, it is to be understood that the governor and control means of this invention is not limited to this embodiment of the invention, but may be adapted by one skilled in the art to control each of the other embodiments of this invention as desired. Figs. 11, 12, and 13 illustrate by wiring diagram three different operational conditions of the control circuit in which a small turbine governor (not shown) operates by hydraulic linkage two floating, biased and synchronized pressure actuated microswitches 275 and 284 of the control circuit in response to governor impulses to control by single phase current means electromagnetic relay or switch means 285, 286, 288, and 289. Electromagnetic means 285 closes a three-phase power circuit to selectively energize through slip rings 296, 297, and 298 two motors 232 and 294 to cooperatively revolve together in a desired direction shaft 227 to control the pitch of turbine impeller blades 202 during rotation. Floating micro-switch means 275, in general, is composed of hydraulic link to the aforesaid turbine governor means by pipe members 336 and 337, floating piston actuating lever means 327, lever 303, with insulated contact means 247, lever end bearing securing means 318, anchored spring biasing means 342, balancing spring means 301 and 302 for insulated contact means 247 and contact means 310 and 311. Floating micro-switch means 284, in general, is composed of hydraulic link to the above mentioned turbine governor means by pipe members 338 and 339, floating piston actuating lever means 328, lever 305 with insulated contact means 248a, lever end bearing securing means 319, anchored spring biasing means 306, balancing spring means 304, and contact means 313 and 314. Electromagnetic means 286 similarly, as relay means 285, reverses in unison the rotation of motors 232 and 294 to control the pitch of the turbine impeller blades during rotation of the turbine in response to speed variation and load demand as sensed by the turbine governor. Electromagnetic relay means 288 and 289 are selectively energized by single phase current means in response to governor impulse. Pressure switch 284 selectively operates contacts 313 and 314 to energize by three-phase current means water flow control motors 234 and 292 to turn shaft 225 in one direction to control blades 230. Electromagnetic relay means 289 selectively controls in unison motors 234 and 292 for the reverse direction of rotation of these motors and shaft 225 to control blades 230. Electromagnetic relay means 288 likewise reverses in unison the direction of rotation of motors 234 and 292 in response to turbine governor impulses to vary by shaft 225 the water supply to the turbine blades to maintain the proper speed and power output from the turbine-generator as the power load demand on the turbine varies during its operation. Fig. 11 specifically shows the operational condition of the control circuit for the turbine at normal speed in which its power output is equal to the load demand, and there is no impulse from the turbine governor to energize any of the relays 285, 286, 288, and 289, and motors 232, 294, 234 and 292. Fig. 12 also specifically shows the operational condition of the control circuit in response to governor impulses for the turbine below normal speed and water gate motors 234 and 292 are energized to open the water blades 230 and the turbine blade pitch motors 232 and 294 are also energized to vary the pitch of the turbine blades 202 for the maximum water flow impact against the turbine impeller blades to increase turbine speed and power output to supply the load demand on the unitary turbine-generator unit. Fig. 13 shows the operational condition of the turbine above normal speed and power demand, and the water blades 230 are being closed by actuation of relay 285 in cooperation with motors 234 and 292 in which the maximum water impact pitch of the turbine impeller blades 202 is being decreased by motors 232 and 294 to lessen turbine speed and power output from the turbine-generator to supply the power load demand.

Fig. 10 illustrates a still further embodiment of the unitary turbine and generator means of this invention in which the pitch of the turbine impeller blades 354 is fixed by being rigidly secured to the inside wall 353 of the rotary penstock member 352 at junctions 355. The activating turbine fluid is directed toward rotating turbine blades 354 by fixed and curved fluid flow blades 356 as shown. The curved shape of blades or vanes 356 may be of any desirable shape to change direction of the passing activating fluid (water) to impart a rotary motion to turbine impeller blades 354, and is not limited to the shape shown. By properly shaping and forming fixed vanes 356 and turbine impeller blades 354, the energy of the moving stream of activating turbine fluid is converted into useful work which turns generator rotor means 378 by cooperating and interconnecting rotary tubular member 352 by which rotary motion of rotor 378 in turn translates by electric generator means 367 the useful work of turbine means 350 into electrical energy. In this embodiment, rotary tubular member 352 is a multipurpose unitary structure which serves as a water conduit member, and cooperatively connects turbine means 350 to generator rotor 378 of the concentrically surrounding generator 367. Electric generator means 367 comprises, in general, a rotor member 378 supported by rotary tubular conduit member 352, and stator means 380 concentrically surrounding rotor 378. Stator 380 of generator 367 is secured by bolt means 373 to stator housing 400 which is secured by bolt means to foundation means 403. Rotor member 378 is concentrically and rigidly secured by members 379 and 381 to integral flange 417 of member 352. Coils of rotor means 378 are energized by direct current from an auxiliary generator (not shown) through slip ring means 375. Rotor 378 of the turbine generator 367 is surrounded by stator member 380 in juxtaposed position being substantially enclosed by casing member 400 and plate-like ring member 398. Rotary turbine means 350 is avially rotatably aligned and supported by thrust bearing means 385. Turbine means 350 is radially and laterally aligned by bearing means 392. Member 398 partially encloses bearing races 386, 388, and bearing means 384 of thrust bearing means 385. Bearing race 386 is secured to integral flange 382 of rotary tubular member 352. Turbine alignment bearing means 392 consists of integral ring member 393 of rotary tubular member 352, roller means 389, support means 390 and bolt means 394 secured to foundation means 403. Water conduit means 359 for the unitary turbine and generator combination consists of tubular members 360, 362, 364, 376, rotary turbine conduit member 352 and draft tube 415. Member 364 as shown, is a partial sectional view of the lower portion of the valve chamber containing valve seat 372. Member 372 forms a connecting shoulder portion between member 364 and member 376. Member 376 is connected by rotary sealing means 407 to rotary tubular member 352. Rotary sealing means 407 comprises a suitable sealing material 401, outer ring member 400a, stationary flange member 402 and rotary flange member 405 of member 352. The rotary tubular member 352 is secured by rotary sealing means 410 to stationary draft tube member 415. Rotary sealing means 410 comprises a suitable sealing material 406, outer ring member 411, stationary flange member 413 of member 415, and rotary flange member 409 of member 352. The water flow control means for turbine 350 is composed of valve member 368 having a seating surface 370, valve stem member 366 and servo motor 358 which is responsive to impulses of a centrifugal turbine governor means (not shown) by hydraulic linkage of pipes 359 and 361 as shown. Valve member 368 is connected by stem 366 to servo motor 358. Servo motor 358 is controlled and energized by being connected as a fluid linkage comprising conduit members 359 and 361 to the turbine governor means. Streamlined directional water flow vanes 356 are secured in fixed relationship to inside wall 357 of stationary penstock member 376 at junctions 365 to more efficiently direct the flow of water against streamlined and oppositely curved impeller blades 354 integrally attached at points 355 of inside walls 353 of rotary penstock member 352. The turbine governor means of this embodiment likewise may be of a conventional centrifugally responsive as illustrated in Fig. 14 or other suitable type of governor well known in the art in which the wtaer or power actuating fluid flow to the turbine 350 is admitted by a servo motor 358 or other suitable energizing means by valve 368 in a manner designed to be responsive to impulses of the governor to regulate the speed of the turbine unit 350 within a desired speed range by incerasing or decreasing the amount of water supplied to the turbine impeller blades 354 in order to insure sufficient electrical power generation to maintain a proper balance between power supply and power demand when a change in load on electric alternator or generator 367 occurs.

In Figs. 1, 2, 4, and 10, the electrical generator or alternator of this invention is conventional in design except that the rotor element of the generator is externally attached to the rotary fluid conduit element of the turbine. The types of electric generator illustrated in Figs. 1, 2, 4, and 10, are synchronous, however, other types, such as induction generators, may be used. In each embodiment of the drawings, coils shown as rotor means are mounted on the external surface of the rotary water conduit member enclosing the turbine impeller blades. These coils are energized or excited by direct current from an auxiliary generator (not shown). The current for the rotor coils is delivered by slip rings 67, 102, 322, and 375 of Figs. 1, 2, 4, and 10, respectively. This arrangement produces a rotating magnetic field which induces alternating current in the stator coils in the generator of electric power.

In each of Figs. 1, 2, 4, and 10, is shown a ball thrust bearing supporting the rotary tubular turbine element, however, there are several conventional types of bearing means that may be used, and it is to be understood that this invention is not limited to ball thrust bearings.

While there has been described what is at present considered to be the preferred embodiments of this invention, it will be obvious to those skilled in the art that various changes and modifications may be made therein without departing from the invention, and it is therefore aimed in the appended claims to cover all such changes and modifications as fall within the true spirit and scope of the invention.

Having thus described my invention, what I claim as new and wish to secure by Letters Patent is:

1. A fluid turbine and electrical energy generating machine comprising activating fluid supply means, fluid flow valve means, servomotor means constructed and arranged to operate said valve means, turbine speed-responsive control means constructed and arranged to control said servomotor and fluid valve means, rotatable tubular conduit means constructed and arranged to convey fluid therethrough, turbine means including variable pitch impeller means disposed in said conduit to rotate said conduit responsive to flow of fluid through said conduit, electric generating means including rotor means carried and rotated by said tubular means and complementary electric stator means surrounding and electrically cooperating with said rotor means to generate electrical energy responsive to passage of fluid through said rotary conduit means, and electrical-mechanical governing and control means including a centrifugal governor to energize and control said servomotor and fluid valve means to vary the activating turbine fluid supply, and variable pitch means for the turbine impeller means to maintain synchronous speed of said turbine, conduit and rotor means to supply varying electrical power load demands on the machine.

2. A hydroelectric energy translating unit comprising activating fluid supply means, electrical energy translating means including electrical rotor means and complementary electrical stator means, a fluid-sealed rotary unitary structure having external electrical rotor means including central conduit means constructed and arranged to pass activating fluid therethrough and turbine impeller means in said conduit to rotate said unitary structure responsive to passage of actuating fluid centrally therethrough, variable pitch fluid control means in stationary penstock means, housing means substantially enclosing said electrical energy translating means and said turbine means, governor means responsive to changes in output of said electrical energy translating means to control by servomotor connected by gear train and shaft means to said turbine impeller means to selectively vary the pitch of said turbine impeller means including electrical-mechanical means connecting governor means by servomotors to said fluid control means by gear shaft and gear train means to control the flow of activating fluid through said turbine means to maintain a steady flow of electrical power to supply electrical energy in conformity with varying energy output of the unit.

3. A hydroelectric machine comprising fluid turbine means, electric generating means including rotor means carried by rotary conduit means and complementary stator means surrounding and electrically cooperating with rotor means, fluid control means, said rotary conduit means having internally a plurality of pivoted turbine blades for rotating conduit responsive to impact of the motion of the activating fluid passing through said blades to rotate conduit and unitary electric rotor to generate electrical energy; a speed-responsive control system comprising centrifugal-speed control mechanism which selectively controls by linkage a plurality of microswitches which are balanced and biased to act in response to speed control mechanism impulses which selectively energize by switch control means and single-phase current control means comprising a plurality of electro-magnetic switch means to selectively energize by three-phase power current means a plurality of cooperating electric servomotors to selectively vary fluid control means and pitch of turbine blades whereby synchronous turbine speed is maintained to supply a continuous power supply of electrical energy to meet varying power load demands on machine.

4. In a hydroelectric machine, a stationary gear controlled first hub and blade means for controlling passage of turbine fluid through a penstock comprising a plurality of coacting and mutually cooperating radially projecting blade means from said first hub means having adjustable pitch means in said first hub to selectively vary pitch of the blades from an overlapping watertight relationship to open position to permit free and controlled passage of fluid therethrough; turbine rotor means fixedly secured in and carried by rotary conduit means comprising second hub means centrally located in said rotary conduit having projecting radially from said second hub a plurality of turbine blades constructed and arranged to be varied in pitch; first servomotor means mutually and cooperatively connected by shaft means to a gear train in said turbine rotor means to variably control pitch of said turbine blades, second servomotor means mutually and cooperatively connected by shaft means to gear train means in said first hub to control said first mentioned blade means; a speed-responsive control system comprising centrifugal-speed control mechanism which selectively controls by linkage a plurality of electro-magnetic means to selectively energize by three-phase power current means a plurality of cooperating electric servomotors to selectively vary the pitch of said first mentioned blade means and the pitch of said turbine blades whereby synchronous turbine speed is maintained to generate electrical energy to meet varying power load demands on said machine.

5. In a hydroelectric machine, a vaned rotor, rotary conduit means for enclosing and carrying said rotor, means for delivering fluid to said rotor, means for varying the area of the passages through said rotor means, fluid control valve means for varying the quantity of liquid delivered to said rotor through said delivering means, means for adjusting the angularity of the vanes of said rotor from the exterior of said enclosing means, and speed-responsive control means comprising centrifugal-speed control mechanism which selectively controls by linkage a plurality of electro-magnetic means to selectively energize by three-phase power current means a plurality of cooperating electric servomotors to selectively vary said fluid control valve means and the pitch of said rotor vanes whereby synchronous rotor speed is maintained to generate electrical energy to meet varying power load demands on said machine.

6. In a hydroelectric turbine construction, a speed-responsive control system comprising centrifugal-speed control mechanism which selectively controls a plurality of microswitches which selectively energize by switch control means and single-phase current control means a plurality of electro-magnetic switch means to selectively energize by three-phase power current means a plurality of cooperating electric servomotors to selectively vary fluid control means and pitch of turbine impeller means whereby synchronous turbine speed is maintained to supply a continuous supply of electric energy to meet varying power load demands on hydroelectric turbine.

7. In a hydroelectrical power unit, a speed-responsive control system comprising centrifugal-speed control mechanism which selectively controls by hydraulic linkage a plurality of microswitches which are balanced and biased to act in response to centrifugal mechanism impulses which selectively energize by switch control means and single-phase current control means a plurality of electro-magnetic switch means to selectively energize by three-phase power current means a plurality of cooperating electric servomotors to selectively vary fluid control means and pitch of turbine impeller means whereby synchronous turbine speed is maintained to supply a continuous supply of electric energy to meet varying power load demands on unit.

8. A hydroelectric power translating unit, comprising a rotating unitary multipurpose tubular means having internal adjustable pitch turbine impeller-blade means secured internally of said tubular means constructed and arranged to rotate said tubular means responsive to flow of fluid therethrough, said tubular means surrounding and cooperating with said turbine impeller means and an external electrical rotor means carried externally by said rotating tubular means and cooperating with said internal impeller means; stationary complementary electric stator means mounted adjacent said rotor means and electrically cooperating therewith, speed-responsive governor means to selectively control both the pitch of the turbine blade means for maximum fluid impact with the turbine blade means and fluid control means actuated by said governor to control the supply of activating fluid to said adjustable pitch turbine impeller-blade means to maintain a steady flow of electrical power to efficiently supply varying load demands on the unit.

9. A hydroelectric power translating unit, comprising a multipurpose rotating tubular means of a unitary structure including adjustable pitch turbine impeller-blade means internally secured to said tubular means and constructed and arranged to rotate said tubular means responsive to the passage of fluid therethrough, said tubular means surrounding and cooperating with the turbine means and an external electrical rotor means mounted concentrically of and carried by the external surface of said rotating tubular member and cooperating with said internal turbine blade means, variable pitch activating fluid control means in stationary penstock means, stationary complementary electric stator means mounted concentrically and externally of said rotor means and electrically cooperating therewith, speed-responsive governor means to selectively control both the pitch of the impeller blade means for maximum fluid impact with the turbine blade means and pitch of said fluid control means to control the supply of activating fluid to said adjustable pitch turbine impeller blade means to effectively supply a steady flow of electrical power to efficiently satisfy varying load demands on the unit.

10. A hydroelectric power translating unit, comprising a multipurpose rotating tubular member of a unitary structure comprising variable pitch turbine impeller blade means internally secured to said tubular member and constructed and arranged to rotate said tubular member responsive to passage of fluid therethrough, said tubular member surrounding and cooperating with the turbine blade means and external electrical rotor means mounted concentrically of and carried substantially by the axial intermediate circumferential portion of the external surface of said rotating tubular member and cooperating with said internal turbine blade means, stationary complementary electric stator means mounted concentrically and externally of the rotor means and electrically cooperating therewith, speed-responsive governor means to control the supply of activating fluid to said turbine means and to selectively control the pitch of said turbine impeller means to efficiently generate electrical power to satisfy varying power load demands on the unit.

11. A hydroelectric power translating unit, comprising a multipurpose fluid sealed rotating tubular means of a unitary structure including variable pitch turbine impeller means internally secured to said tubular member constructed and arranged to rotate said tubular member responsive to flow of fluid therethrough, said tubular means surrounding and cooperating with said turbine impeller means and external electrical rotor means mounted concentrically of and carried substantially by the intermediate axial circumferential portion of the external surface of said rotating tubular means and cooperating with said turbine impeller means; means for controlling the flow of fluid through said tubular means, stationary complementary electric stator means mounted concentrically and externally of said rotor means and electrically cooperating therewith, speed-responsive turbine governor means, electro-magnetic switch means, current supply means, three-phase power circuit means and control circuit means energized by single-phase current means and responsive to impulses of said turbine governor to activate by said control circuit means said electro-magnetic switch means which selectively energize by said power circuit means electroservomotors to selectively control the fluid flow means and said variable pitch turbine impeller means to vary generation of electric energy by said electrical rotor means to satisfy electric power demands on the unit.

12. A composite hydroelectric power generating and translating machine, comprising a multipurpose rotating tubular means of a unitary structure including adjustable turbine impeller blade means internally secured to said tubular means and constructed and arranged to rotate said tubular means responsive to passage of fluid through said turbine means said tubular means surrounding and cooperating with said turbine blade means, and electric current generating means comprising external electrical rotary means mounted concentrically of the tubular means and carried substantially by the axial intermediate circumferential portion of the external surface of said rotating tubular means cooperating with said internal turbine blade means, stationary complementary electric stator means mounted concentrically and externally of the rotary means and electrically cooperating therewith, power circuit means, speed-responsive governor means and control circuit means comprising electric current supply means, circuit means and electro-magnetic switch means energized by said current means and responsive to governor impulses which selectively actuate said electro-magnetic means which selectively energize by said power circuit means electroservomotor means to selectively control activating fluid flow supply to the turbine and degree of pitch of the turbine blades to supply a steady flow of electrical power to efficiently satisfy varying power load demands on the unit.

References Cited in the file of this patent

UNITED STATES PATENTS

| | | |
|---|---|---|
| 1,129,830 | Pearson | Feb. 23, 1915 |
| 1,448,627 | Huguenin | Mar. 13, 1923 |
| 1,485,186 | Harza | Feb. 26, 1924 |
| 1,505,853 | Brainard | Aug. 19, 1924 |
| 1,562,556 | Harza | Nov. 24, 1925 |
| 1,566,872 | Ishizaka | Dec. 22, 1925 |
| 2,381,250 | Baumann | Aug. 7, 1945 |
| 2,666,149 | Fumagalli | Jan. 12, 1954 |

FOREIGN PATENTS

| | | |
|---|---|---|
| 99,887 | Sweden | Sept. 24, 1940 |